July 19, 1966     A. J. NORGAARD, JR., ETAL     3,261,619
CHILD'S COASTER VEHICLE
Filed Oct. 24, 1962     5 Sheets-Sheet 1
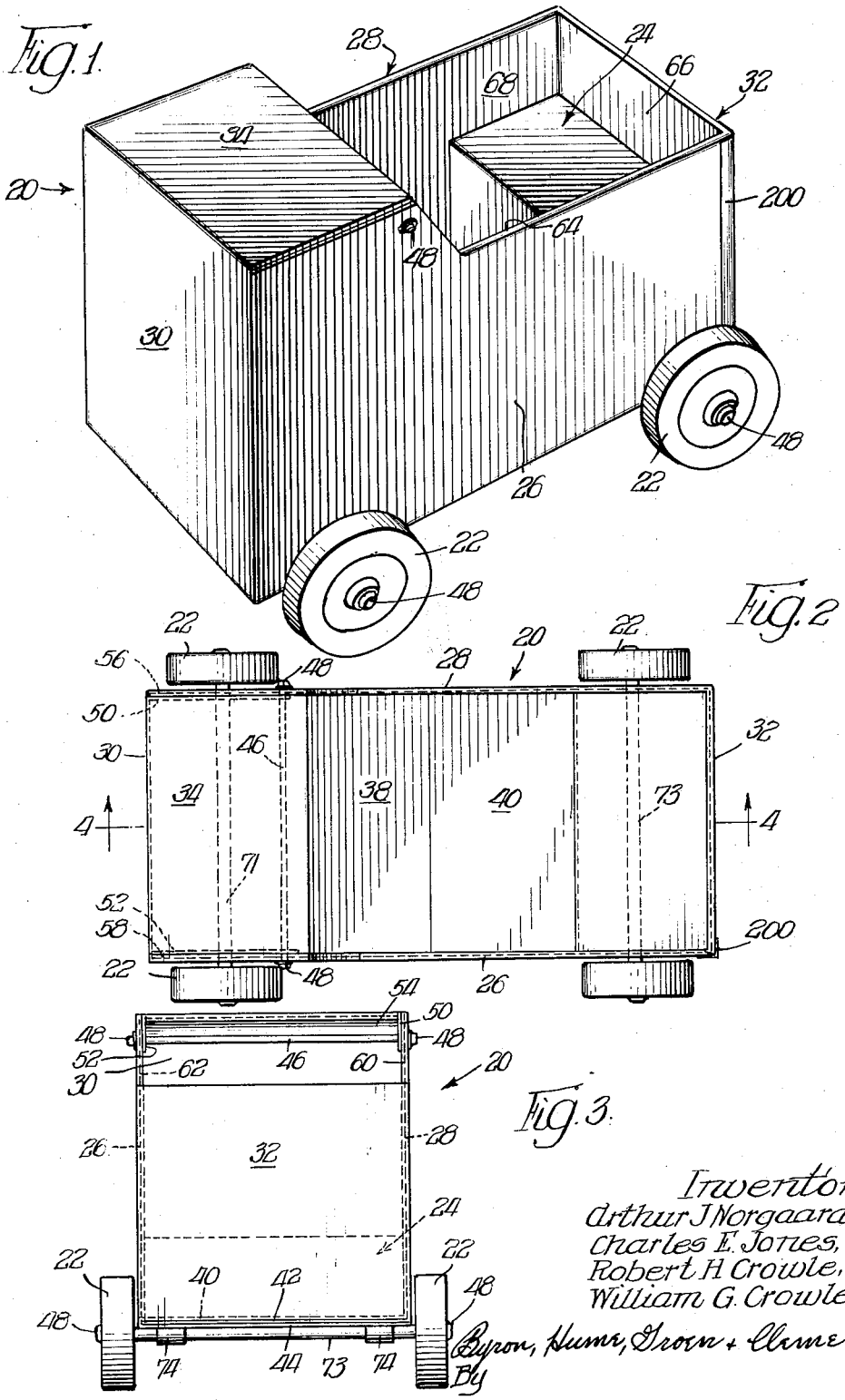

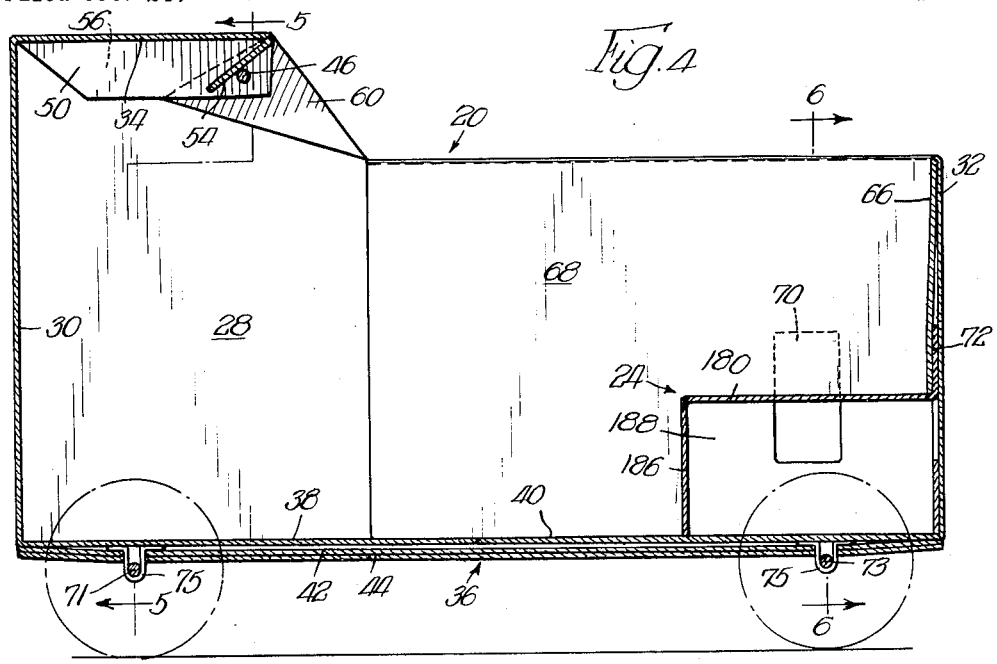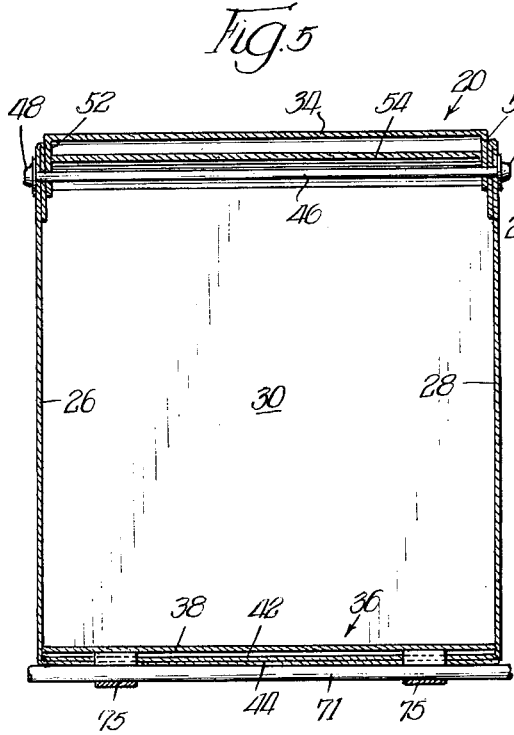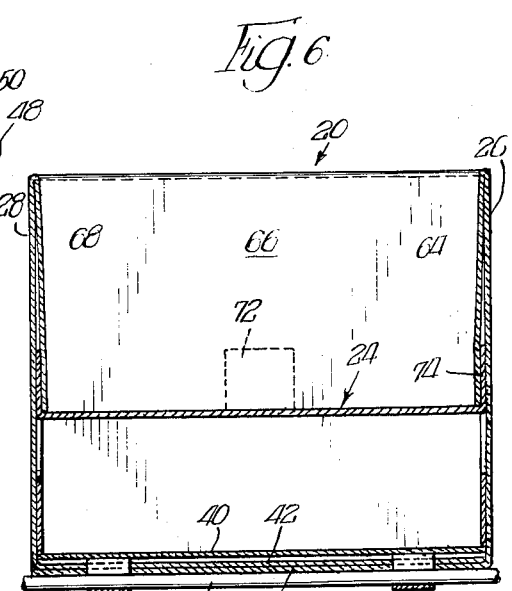

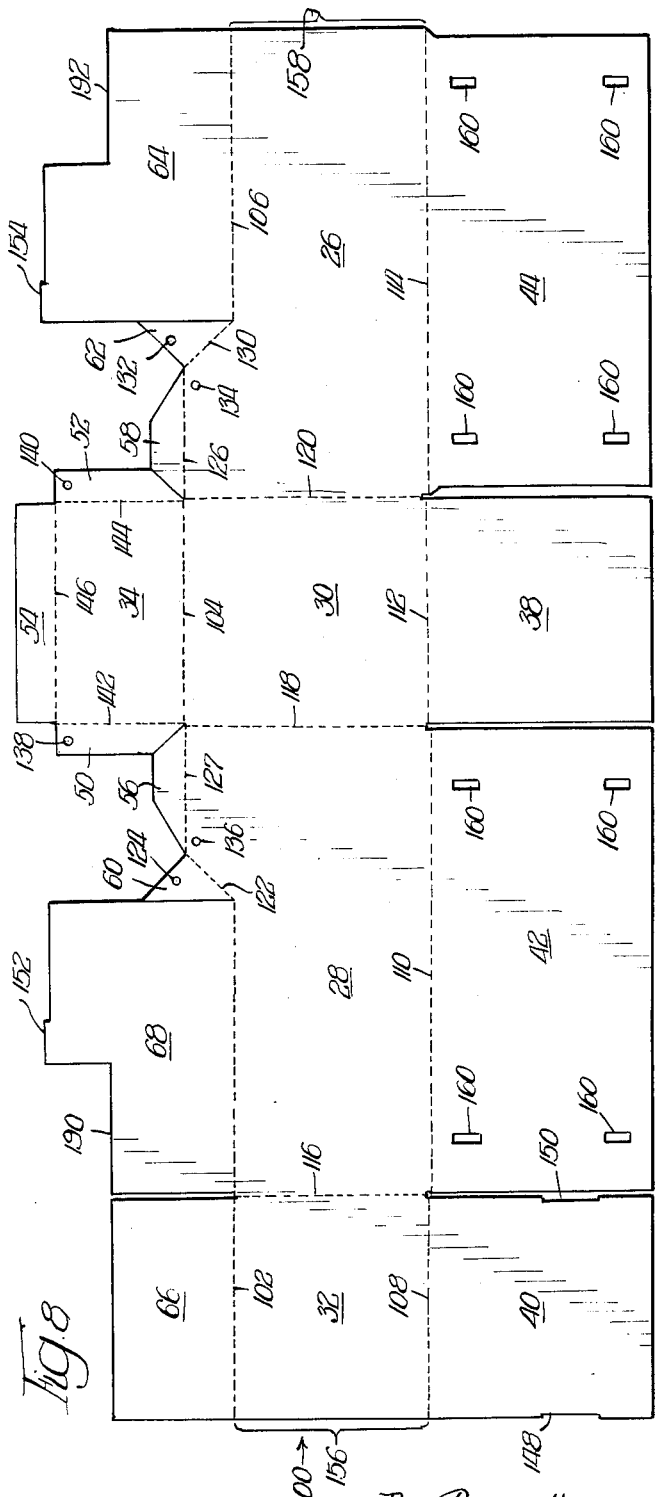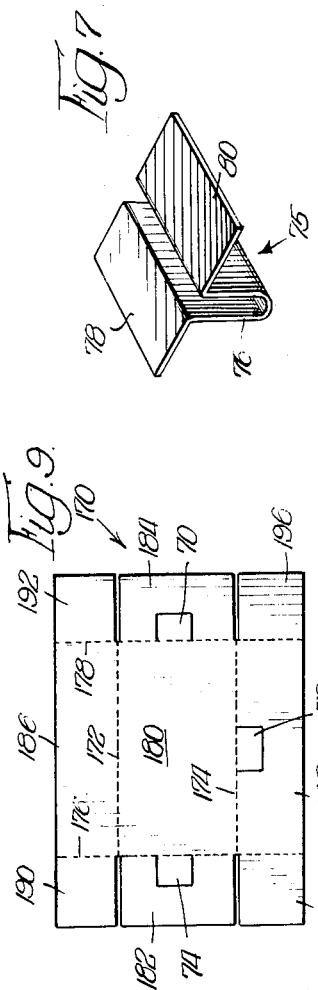

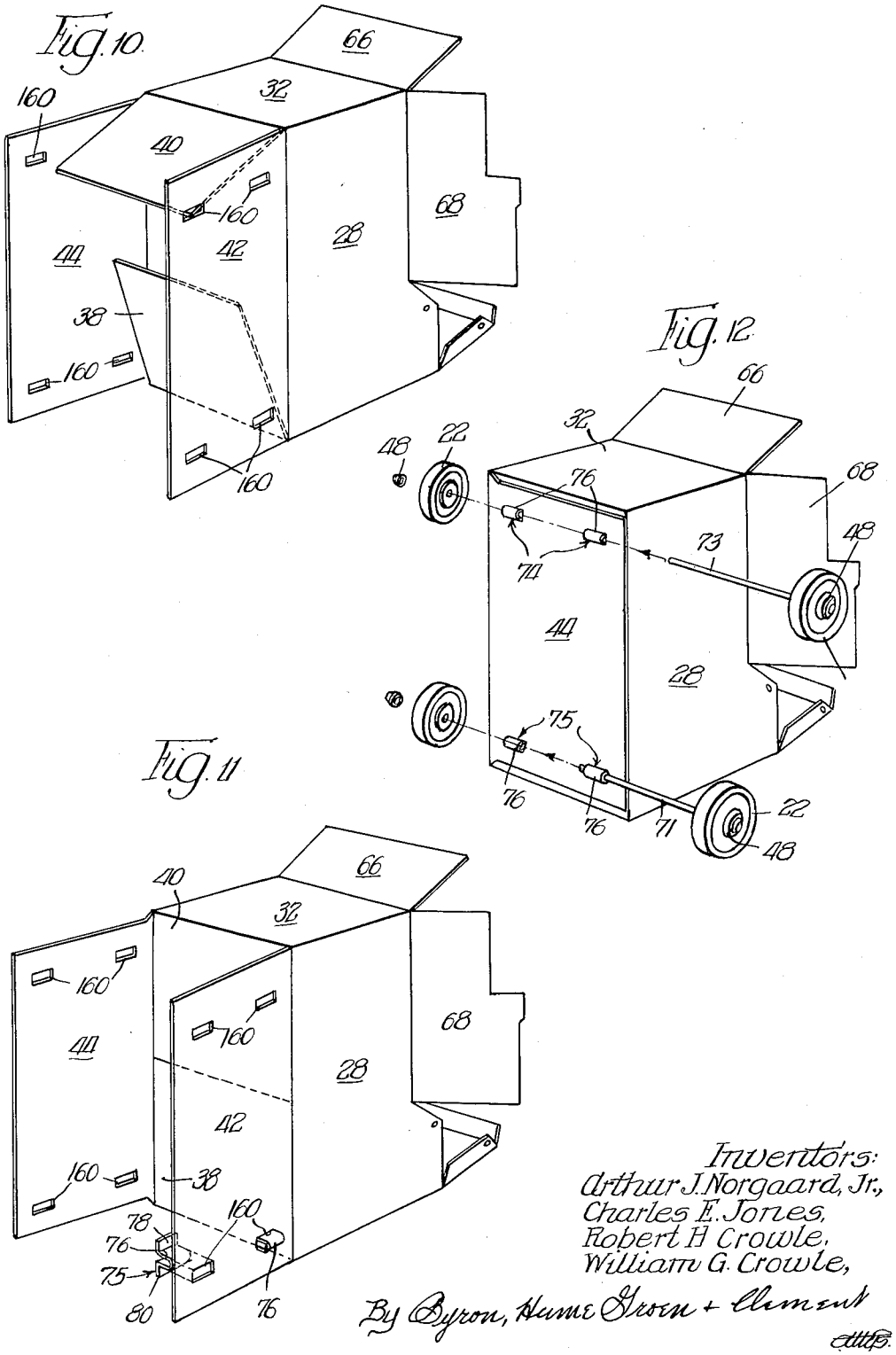

July 19, 1966   A. J. NORGAARD, JR., ETAL   3,261,619
CHILD'S COASTER VEHICLE
Filed Oct. 24, 1962   5 Sheets-Sheet 5
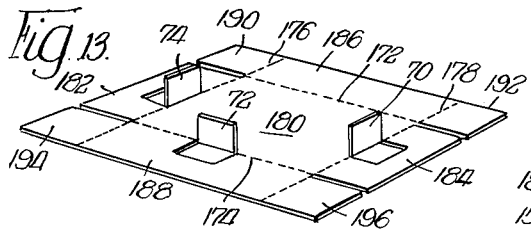
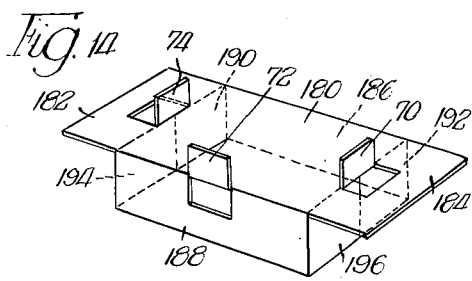
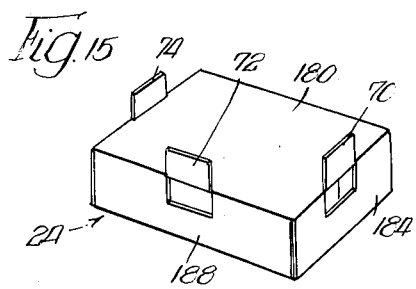
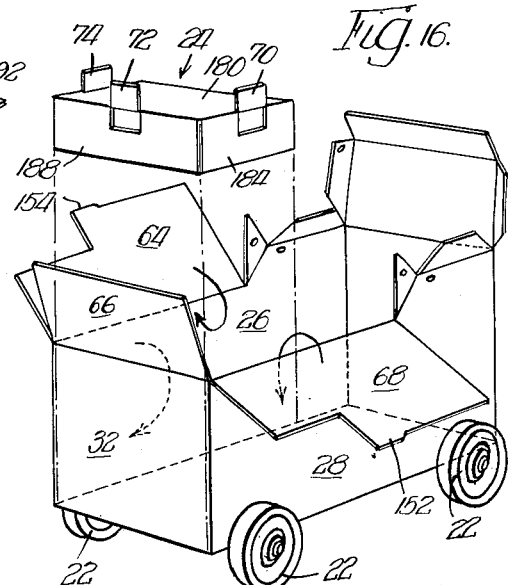
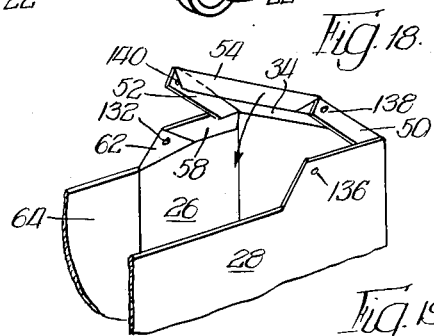
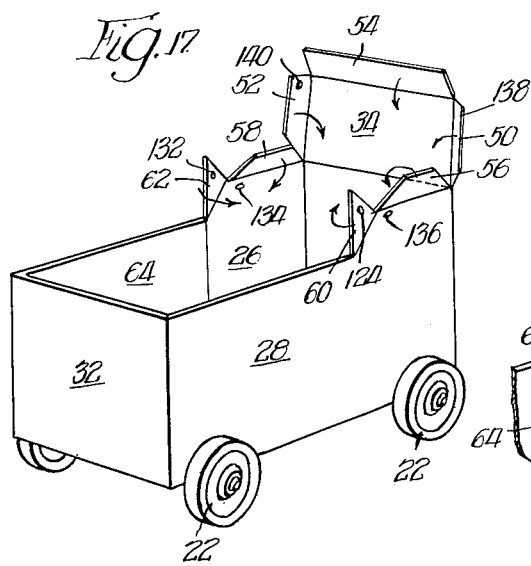
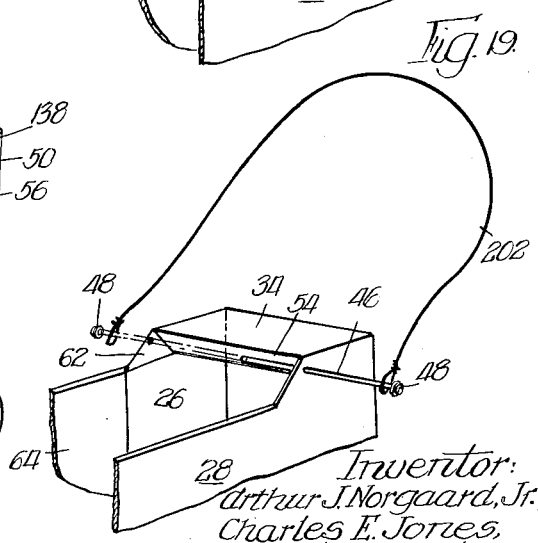
Inventor:
Arthur J. Norgaard, Jr.,
Charles E. Jones,
Robert H. Crowle,
William G. Crowle,
By Byron, Hume, Groen & Clement
Attys United States Patent Office 3,261,619
Patented July 19, 1966

3,261,619
CHILD'S COASTER VEHICLE
Arthur J. Norgaard, Jr., Sheboygan, Wis., and Charles E. Jones, Evanston, Robert H. Crowle, Mount Prospect, and William G. Crowle, Deerfield, Ill., assignors to General Box Company, Des Plaines, Ill., a corporation of Delaware
Filed Oct. 24, 1962, Ser. No. 232,728
7 Claims. (Cl. 280—79.2)

The present invention relates to toys and, more particularly, to a toy made of corrugated cardboard and the like and an axle assembly for such a toy.

It is an object of the present invention to provide a toy adapted to be made of corrugated cardboard and the like.

It is a further object of the present invention to provide a toy adapted to be made of corrugated cardboard and the like, the toy being constructed of cardboard blanks which may be folded to form the toy.

It is another object of the present invention to provide a toy made of corrugated cardboard and the like wherein the cut and sharp edges of the cardboard and the like are not exposed.

It is still another object of the present invention to provide a durable toy made of corrugated cardboard and the like.

It is another object of the present invention to provide a toy made of corrugated cardboard and the like wherein a minimum number of fasteners are needed to assemble said toy.

It is still another object of the present invention to provide for a toy made of corrugated cardboard and the like an axle assembly adapted to be incorporated therein whereby the toy may be mounted upon wheels.

The invention, both as to its organization and method of operation taken with further objects and advantages thereof, will best be understood by reference to the following description, taken in conjunction with the accompanying drawings, in which:

FIGURE 1 is a perspective view of a toy embodying the features of the present invention;

FIGURE 2 is a plan view of the toy illustrated in FIGURE 1;

FIGURE 3 is a rear elevational view of the toy illustrated in FIGURE 1;

FIGURE 4 is a cross-sectional view of the toy of FIGURE 1 taken along line 4—4 of FIGURE 2;

FIGURE 5 is a cross-sectional view of the toy of FIGURE 1 taken along line 5—5 of FIGURE 4;

FIGURE 6 is a cross-sectional view of the toy of FIGURE 1 taken along line 6—6 of FIGURE 4;

FIGURE 7 is a perspective view of axle clips embodying the features of the present invention which is utilized in the axle assembly of the toy illustrated in FIGURE 1;

FIGURE 8 is a plan view of a blank from which the main body of the toy illustrated in FIGURE 1 is made;

FIGURE 9 is a plan view of a blank from which the seat of the toy of FIGURE 1 is made;

FIGURE 10 is a perspective view of the blank shown in FIGURE 7 during the initial step of folding the blank to form the bottom of the toy illustrated in FIGURE 1;

FIGURE 11 illustrates the next step in folding the blank illustrated in FIGURE 7 when forming the bottom of the toy;

FIGURE 12 illustrates the final step of securing the axles and wheels to the bottom of the toy;

FIGURE 13 illustrates the first step in folding the seat blank illustrated in FIGURE 9 to form the seat of the toy illustrated in FIGURE 1;

FIGURE 14 illustrates the second step of folding the seat blank illustrated in FIGURE 9 to form the seat of the toy illustrated in FIGURE 1;

FIGURE 15 illustrates the final step in folding the seat blank illustrated in FIGURE 9 to form the seat of the toy illustrated in FIGURE 1;

FIGURE 16 illustrates the manner in which the seat is placed in the toy and the main blank folded to secure the seat in position;

FIGURE 17 illustrates the first step of folding the main body blank to secure the top panel of the toy illustrated in FIGURE 1;

FIGURE 18 illustrates the next step of folding the main blank to secure the top panel of the toy illustrated in FIGURE 1; and FIGURE 19 illustrates the final step of securing the top panel of the toy illustrated in FIGURE 1.

Referring now to the drawings, and more particularly to FIGURE 1, there is illustrated a toy embodying the features of the present invention and indicated generally by reference numeral 20. The toy 20 is made of corrugated cardboard or the like in a manner more apparent hereinafter and is mounted upon wheels 22 for mobility. The toy 20 is particularly adapted for use by young children. The children may sit in it upon the seat 24, push or pull the toy 20, or use it to carry other toys and the like. As will be more apparent hereinafter the toy 20 is constructed in such a manner that it is easily assembled from two foldable blanks of corrugated cardboard and is reasonably durable to children's use. In addition, the cut or free edges of the corrugated cardboard blanks employed in assembling the toy 20 are hidden in order that the children playing with the toy 20 will not receive paper cuts and the like.

Referring to FIGURES 1–6 the toy 20 includes side panels 26 and 28, a front panel 30, a rear panel 32, a top panel 34 and a bottom assembly indicated generally by reference numeral 36 which includes flaps 38, 40, 42 and 44 (FIGURES 2 and 4). The top panel 34 is held in position by a strut rod 46 which extends through holes in the side panels 26 and 28. The strut rod 46 has retainer caps 48 secured to its free ends to prevent it from sliding out of the toy 20. The strut rod 46 is a metal rod made of steel or the like, the retainer caps 48 being hammered or otherwise force fitted upon the ends of the strut rod 46. The retainer caps 48 do not per se constitute a part of the present invention and any type of securing means, such as nuts or the like, may be employed on the free ends of the strut rod 46 to prevent it from slipping out of the toy 20.

The top panel 34 has a pair of side flaps 50 and 52 each having a hole therein through which the strut rod 46 extends to secure the top panel 34 in position. An end flap 54 is also secured to the top panel 34. The end flap 54 is folded beneath the top panel 34 and held in this position by the strut rod 46 as shown in FIGURE 4.

Two pairs of flaps, one pair comprising flaps 56 and 58 connected to the side panels 28 and 26, respectively, and the other pair comprising flaps 60 and 62 attached to the side panels 28 and 26, respectively, are folded inwardly between the side panels 26 and 28 and the flaps 50 and 52 to preclude the exposure of the cut edges of the corrugated cardboard about the top panel 34 of the toy 20. The flaps 60 and 62 are prevented from unfolding by virtue of the strut rod 46 extending through a hole in each of them, as will be more apparent hereinafter. The flaps 56 and 58 are prevented from unfolding by the flaps 50 and 52 respectively, held in position by the strut rod 46 as described hereinbefore.

The seat 24 of the toy 20 is held in position by side flap 64, end flap 66 and side flap 68 attached to side panel 26, end panel 32 and side panel 28, respectively.

The seat 24 has upwardly extending tabs 70, 72 and 74, which are positioned between their respective side or end panel and its associated flap as seen in FIGURES 4 and 6. The side flaps 64 and 68 hold the end flap 66 in position and are in turn held in position by cooperating with the bottom flap 40 in a manner more apparent hereinafter.

The toy 20 is mounted upon the wheels 22 held in position by an axle assembly comprising axle rods 71 and 73 which are secured to the bottom assembly 36 of the toy 20 by pairs of axle clips indicated generally by reference numeral 75. As seen in FIGURE 7 the axle clip 75 includes a U-shaped section 76 adapted to receive the axle rod 71 or 73 and outwardly extending flange ends 78 and 80 attached to the free ends of the U-shaped section 76. The flanges 78 and 80 are held by the bottom assembly 36, and more particularly the flaps 38, 40, 42 and 44, as will be more apparent hereinafter. In this manner the axle clips 75 are held in position by the bottom assembly 36 and the axle rods 71 and 73 are inserted into and held by the U-shaped sections 76 of the axle clips 75. The axle rods 71 and 73 prevent the bottom assembly 36 of flaps 38, 40, 42 and 44 from unfolding.

The wheels 22 are placed on the axle rods 71 and 73 and secured thereto by retainer caps 48 which are hammered or otherwise secured to the free ends of the axle rods 71 and 73. It will be understood that the axle rods 71 and 73 are metallic rods or tubes of sufficient diameter and strength to support the toy 20 and anything likely to be carried by the toy 20 when used by children.

Referring now to FIGURE 8 there is illustrated a blank of corrugated cardboard indicated generally by reference numeral 100 which has been cut out in such a manner as to provide all of the panels, flaps and the like discussed hereinbefore with reference to FIGURES 1–6 for the main body of the toy 20, i.e., excluding the seat 24. It will be understood that the dotted lines shown in FIGURE 8 are the fold lines of the blank 100.

Basically, the blank 100 of corrugated cardboard or the like is divided from left to right into end panel 32, side panel 28, front panel 30, and side panel 26 by longitudinally extending fold lines 102, 104, 106, 108, 110, 112 and 114 and by transversely extending parallel fold lines 116, 118 and 120. The fold lines 102, 104, and 106 are parallel to one another and are also parallel to fold lines 108, 110, 112, and 114.

The side panels 26 and 28 have flaps 62 and 58 and 60 and 56, respectively, attached thereto. The flap 62 is triangularly shaped and is formed by fold line 130. A hole 132 therein is adapted to receive the strut rod 46 as described hereinbefore. The flap 58 is trapezoidally shaped and is formed by fold line 126 which is parallel to fold lines 110 and 102. The flap 60 is triangularly shaped and formed by the fold line 122. A hole 124 therein is adapted to receive the strut rod 46 as described hereinbefore. The flap 56 is trapezoidally shaped and is formed by fold line 127 which is parallel to the fold lines 110 and 112.

In addition, the side panel 26 has the side flap 64 attached thereto along the fold line 106. The side flap 64 has a small outwardly extending tab 154 which cooperates with a notch 150 in the bottom flap 40 in a manner more apparent hereinafter to hold the side flap 64 in proper position. Furthermore, there is provided an L-shaped free edge 192 on the side flap 64 which, as will be more apparent hereinafter, holds the seat 24 in place in the toy 20. Attached to the bottom of the side panel 26 along the fold line 114 is the bottom flap 44 which has four slots 160 therein adapted to receive the axle clips 75 described hereinbefore.

The side panel 28 has the side flap 68 attached thereto along the fold line 102. The side flap 68 has a small outwardly extending tab 152 which cooperates with a notch 148 in the bottom flap 40 in a manner more apparent hereinafter to hold the flap 68 in proper position. Furthermore, there is provided an L-shaped free edge 190 on the side flap 68 which, as will be more apparent hereinafter, holds the seat 24 in place in the toy 20. Attached to the bottom of the side panel 28 along the fold line 110 is the bottom flap 42 which has four slots 160 therein adapted to receive the axle clips 74 described hereinbefore.

The side panel 26 and the side panel 28 have a hole 134 and 136, respectively, therein adapted to receive the strut rod 46. Thus the side panels 26 and 28 and the corresponding flaps connected thereto are identical with the exception that the length of the bottom flap 44 is slightly less than the length of the bottom flap 42.

Attached to the upper part of the front panel 30 along the fold line 104 is the top panel 34 with side panels 50 and 52 having holes 138 and 140, respectively, therein which are also adapted to receive the strut rod 46. The panels 50 and 52 are formed by fold lines 142 and 144, respectively. At the end of the top panel 34 there is a flap 54 formed by the fold line 146. Attached to the lower part of the front panel 30 along the fold line 112 is the bottom panel 38.

The bottom flap 40 is attached to the rear panel 32 along fold line 108 and has in its side edges the grooves 148 and 150 which, as will be more apparent hereinafter, are adapted to receive the tabs 152 and 154, respectively, to hold the side flaps 68 and 64, respectively, in position. The end flap 66 is secured to the rear panel 32 along the fold line 102.

The rear panel 32 and the side panel 26 have free edges 156 and 158, respectively, which are held together in adjacent abutting relationship by tape 200 or the like shown only in FIGURES 1 and 2. The blank 100 is received by the customer with the edges 156 and 158 already having been secured together by the tape 200 in order to further facilitate the assembly procedure.

Referring now to FIGURE 9 there is illustrated a preformed blank of corrugated cardboard or the like for constructing the seat 24 of the toy 20. This seat blank is indicated generally by reference numeral 170. The blank 170 has a pair of longitudinally extending fold lines 172 and 174 and a pair of transversely extending fold lines 176 and 178. The fold lines 172, 174, 176 and 178 form a central seat panel 180 having side flaps 182 and 184 and forward and rear flaps 186 and 188, respectively. The forward flap 186 has end flaps 190 and 192 thereon while the rear flap 188 has end flaps 194 and 196. The tabs 70, 72, and 74 are attached to the central seat panel 180.

Referring now to FIGURES 10–19 the manner in which the toy 20 is assembled will be described in more detail. As shown in FIGURE 10 the blank 100 has been attached along edges 156 and 158 to form a box-like structure open at the bottom and the top. A convenient way, although not the only way, to assemble the toy 20 is by securing the bottom and axle assembly and placing the wheels thereon. This is effected by folding the flaps 40 and 38 inwardly between the flaps 42 and 44 until the free ends of the flaps 38 and 40 are in abutting relationship as shown in FIGURE 11. The axle clips 75 are then placed into the flap 42 by inserting the U-shaped sections 76 of the clips 75 into the holes 160 until the flanges 78 and 80 of the axle clips 75 contact the interior surface of the bottom flap 42. The bottom flap 42 is then folded over the flaps 40 and 38 and the flap 44 folded over the flap 42. The U-shaped sections 76 of the axle clips 75 extend through the openings 160 in the flap 44 whereby the U-shaped section 76 of the axle clip 75 extends outwardly from the flap 44 as shown in FIGURE 12.

The axle rods 71 and 73 are then inserted through the U-shaped sections 76 of the pairs of axle clips 75 now securely positioned at the rear and forward portion of the toy 20. If desired a wheel 22 and retainer cap 48 may be placed on one end of each rod 71 and 73 and the other end of the rods passed through the appropriate clips 75. After the axle rods 71 and 73 have been placed through their respective pair of axle clips 75, another wheel 22 and retainer cap 48 are placed on the free ends of the axle rods 71 and 73 to complete the wheel assembly on the bottom of the toy 20. The axle rods 71 and 73 prevent the flaps 38, 40, 42 and 44 from opening. The toy 20 in this stage of completion is illustrated in FIGURE 16.

Referring now to FIGURES 13–15, the manner in which the blank 170 is folded to form the seat 24 of the toy 20 is illustrated. The first step is to fold the tabs 70, 72 and 74 along their fold lines 178, 174, and 176, respectively, until they are in a substantially vertical position as shown in FIGURE 13. The forward flap 186 and the rear flap 188 are then folded downwardly along fold lines 172 and 174, respectively, and the end flaps of each, 190, 192, 194 and 196, are then folded inwardly in order that their free ends abut the opposing end flap to thereby form side walls substantially perpendicular to the end flaps 186 and 188, as shown in FIGURE 14. The side flaps 182 and 184 are then folded downwardly over end flaps 194 and 190 and 196 and 192, respectively, to the vertical position shown in FIGURE 15. The seat assembly 24 is ready to be inserted into the toy.

As shown in FIGURE 16 the seat assembly 24 is lowered into the rear portion of the toy 20 while the flaps 64, 66 and 68 are extending outwardly from the toy. The tabs 72 and the rear flap 188, when the seat 24 has been placed in the toy 20, are adjacent to the rear panel 32 of the toy 20. Likewise the tab 74 and the side flap 182 and the tab 70 and the side flap 184 are adjacent to the side panels 26 and 28, respectively. The rear panel 66 is then turned inwardly as shown in FIGURE 16 until it is in the interior of the toy 20 and substantially parallel with the rear panel 32. Then the side flaps 64 and 68 are likewise folded inwardly and downwardly into the interior of the toy 20 until they are substantially parallel to the side panels 26 and 28, respectively, and the tabs 154 and 152 enter the slots 150 and 148, respectively, thereby holding the side flaps 64 and 68 in position. The flaps 64 and 68 slightly overlap the sides of the rear flap 66 whereby the latter is precluded from unfolding. The notches 190 and 192 in the panels 64 and 68, respectively, conform to the transverse cross-section of the seat 24 and thereby also hold the seat 24 in position. The toy 20 in this stage of assembly is illustrated in FIGURE 17.

The last stage of assembling the toy 20 is to secure the top panel 30 in position in such a manner that the edges of the blank 100 are not exposed. To these ends, the first step in securing the top panel 34 is to fold downwardly flaps 58 and 62 in order that they are substantially co-planar and contiguous with the side panel 26, as shown in FIGURE 18. Likewise the flaps 56 and 60 are folded downwardly and inwardly in order that they are substantially co-planar and contiguous with the side panel 28. In this manner the holes 132 and 138 of the flap 62 and side panel 26, respectively, are aligned with one another as are the holes 124 and 136 in the flap 60 and the side panel 28, respectively.

The side flaps 50 and 52 connected to the top panel 34 are folded inwardly so that they are substantially perpendicular to the top panel 34 and the end flap 64 is folded downwardly and inwardly so that it forms an angle of substantially less than 90° with the top panel 34. The top panel 34 is then folded downwardly to a substantially horizontal position until the hole 140 is aligned with the holes 132 and 134 and the hole 138 is aligned with the holes 124 and 136. The strut rod 46 is then inserted through the holes 136, 124, 138, 140, 132 and 134 so that its free ends are extending outwardly from the side panels 26 and 28. Retainer caps 48 are then placed on the ends of the strut rod 46 to prevent it from sliding out of the toy 20. The ends of a rope 202 may be tied to the free ends of the strut rod 46 before or after the retainer caps 48 are placed thereon to provide a means by which the child may pull the completed toy assembly 20. It will be understood that the end flaps 50 and 52 extend beyond the flaps 58 and 56 thereby preventing these flaps from unfolding. The end flap 54 is prevented from unfolding by the strut rod 46 as seen in FIGURES 4 and 19.

It will be understood that the various steps discussed above in assembling the toy 20 may be effected in various different sequences resulting in the same assembled toy 20. The foregoing detailed discussion is not intended to limit the sequential steps of assembling the toy 20. Furthermore, if the seat 24 is not desired the notches 190 and 192 may be omitted and the rear flap 66 extended in order that it extends substantially to the bottom of the interior of the toy 20.

It will be further understood that although the blanks 100 and 170 may be made of corrugated cardboard, they may also be made from other paper-like materials or a suitable plastic material. Corrugated cardboard, however, is preferred because it is inexpensive and easy to cut. It will be further understood that the blanks 100 and 170 are designed so that they may be pre-cut from single sheets of corrugated cardboard and the fold lines simultaneously placed therein.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A toy comprising an integral sheet of corrugated cardboard or the like having side panels, a top panel, a rear panel, a front panel, and bottom flaps formed by fold lines, said bottom flaps having an axle assembly associated therewith to prevent said bottom flap from unfolding when assembled, said top panel having first flaps associated therewith to secure said top panel in position between said side panels, and said side panels and rear panel each having a second flap associated therewith which cooperate with one another and said bottom flaps whereby said second flaps are fixedly secured in said toy when assembled, said second flaps securing a seat in said toy.

2. The toy of claim 1 wherein said seat is made of another integral sheet of corrugated cardboard or the like and has tabs thereon positioned between said second flaps and said side panels and rear panels.

3. A toy having a seat therein and being mounted upon wheels, said toy comprising a first integral sheet of corrugated cardboard or the like having side panels, a rear panel and a front panel formed by first fold lines in said first integral sheet, said first integral sheet having a side flap attached to each of said side panels along second fold lines and a rear flap attached to said rear panel along a third fold line, said seat being formed by a second integral sheet of corrugated cardboard or the like, said side flaps and rear flap holding said seat in said toy.

4. The toy of claim 3 wherein said second integral sheet forming said seat has a pair of parallel longitudinally extending fourth fold lines and a pair of parallel transversely extending fifth fold lines, said fourth and fifth fold lines forming a seat panel, two second side flaps, a second rear flap, and a front flap, said second rear flap and said front flap each having a pair of end flaps formed by said fifth fold lines, said second integral sheet having two side tabs and a rear tab, said tabs adapted to be held in position between said side and rear flaps and said side panels and rear panel.

5. A toy comprising a first integral sheet of corrugated cardboard or the like having fold lines therein forming a rear panel having one side thereof connected to a first side panel, said first side panel having one side thereof connected to a front panel, said front panel having one side thereof connected to a second side panel, said side panels each having a first bottom flap attached thereto, said front and rear panels each having a second bottom flap attached thereto, said front panel having a top panel attached thereto, whereby said first bottom flaps are folded over said second bottom flaps to form a bottom of said toy and said top panel is secured to said side panels to form a top for said toy, a seat formed of a second integral sheet of corrugated cardboard or the like held in said toy by side flaps and a rear flap attached to said side panels and rear panel, respectively.

6. The toy of claim 5 wherein said first bottom flaps have slots therein which are adapted to receive and support an axle clip, a plurality of axle clips supported by said first bottom flaps whereby axle rods for wheels are held in position by said axle clips.

7. The toy of claim 6 wherein said top panel has flaps thereon each having a first hole therein, said holes aligning with second holes in said side panels whereby a strut means extending through said first and second holes holds said top panel in proper position.

References Cited by the Examiner
UNITED STATES PATENTS

| | | | |
|---|---|---|---|
| 1,507,663 | 9/1924 | Carley | 280—79.2 X |
| 1,932,368 | 10/1933 | Bowman | 229—8 X |
| 2,158,661 | 5/1939 | Kehrer | 229—52 |
| 2,412,031 | 12/1946 | Bergstein | 229—37 |
| 3,002,672 | 10/1961 | Kotowick | 229—37 X |
| 3,092,298 | 6/1963 | Scholle | 229—39 |

BENJAMIN HERSH, *Primary Examiner.*

LEO FRIAGLIA, *Examiner.*

W. A. MARCONTELL, *Assistant Examiner.*